United States Patent Office 3,514,708
Patented May 26, 1970

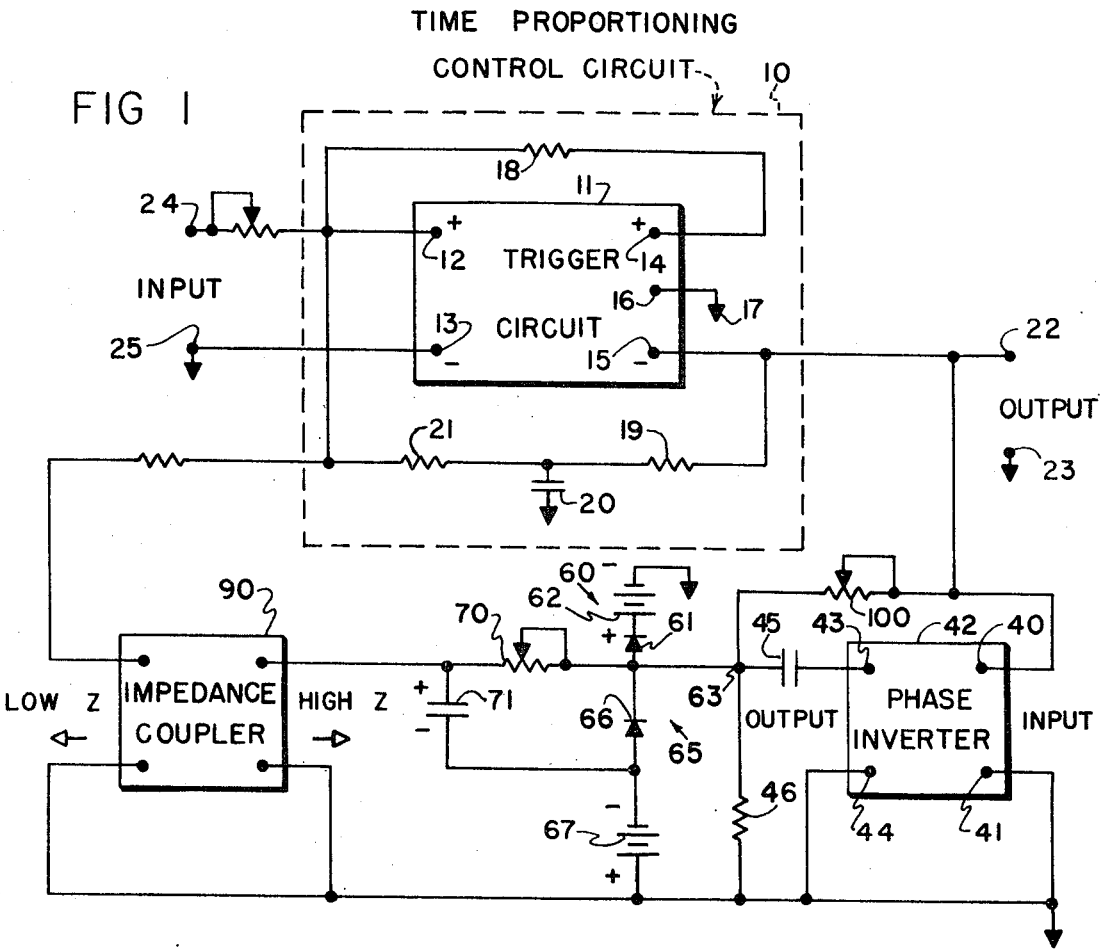
FIG 1 TIME PROPORTIONING CONTROL CIRCUIT
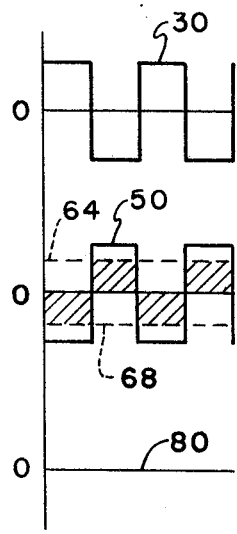
FIG 2
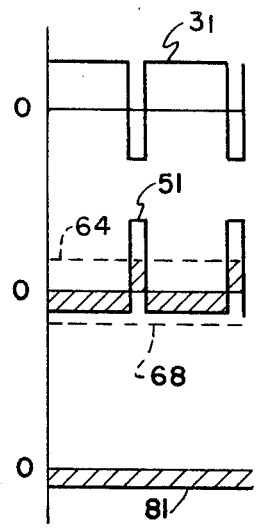
FIG 3
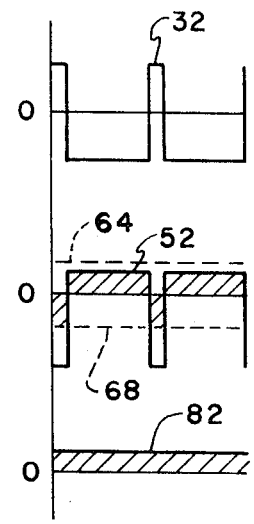
FIG 4
INVENTORS.
Yves de Bretagne
Maximilien Brossmer
Claude Lapresle

---

3,514,708
TIME PROPORTIONING CONTROL CIRCUIT WITH RESET FEEDBACK AND AUTOMATIC RESET LOCKOUT
Yves de Bretagne, Maximilien Brossmer, and Claude Lapresle, Amiens, France, assignors to Honeywell Inc., Minneapolis, Minn., a corporation of Delaware
Filed Aug. 7, 1967, Ser. No. 658,722
Claims priority, application France, Dec. 16, 1966, 87,129
Int. Cl. H03k 7/08
U.S. Cl. 328—209      10 Claims

ABSTRACT OF THE DISCLOSURE

A series connected phase inverter, capacitor and load resistor connected to receive the cyclic pulse-width-modulated output signal of a control circuit, to thus develop a cyclic control voltage across the load resistor only when the control circuit is operating within its proportioning band, a pair of diodes connected to the load resistor to clip opposite half cycles of the cyclic control voltage, R-C integrating means connected to the diodes to integrate the clipped cyclic control voltage and produce a DC reset voltage, a positive feedback circuit connecting the DC voltage to the input of the control circuit as a reset signal, and a resistance connected in parallel with only the series connected phase inverter and capacitor to develop an anti-reset signal only when the control circuit is operating outside its proportioning band.

BACKGROUND OF THE INVENTION

The prior art provides time proportioning control circuits with both feedback, automatic reset lockout, and anti-reset feedback. Our invention relates to a simple capacitor means—clipping means structure to provide both reset and lockout, and, in combination therewith, a simple resistance path to provide anti-reset feedback.

SUMMARY OF THE INVENTION

Our invention provides a first capacitor means and a load connected to develop a cyclic control signal across the load only when a time proportioning control circuit is operating within its proportional band. First and second clipping means are utilized to clip alternate half cycles of the control signal and to develop an average DC signal whose polarity and magnitude is dependent upon the time-proportioning or pulse-width-modulation operation of the control circuit. A reset feedback means connects this DC signal to the control circuit.

As a more specific feature of our invention, we provide integrating means to integrate the DC signal and we utilize positive feedback as the reset feedback means.

As a more specific feature of our invention, we also provide anti-reset feedback when the control circuit is operating outside of its proportional band.

BRIEF DESCRIPTION OF THE DRAWING

FIG. 1 is a schematic showing of the preferred embodiment of our invention,

FIG. 2 is a graph showing the relationships between the output of the time proportioning control circuit, the signal developed across the load resistor at the output of the phase inverter, and the average DC signal, as provided by the structure of FIG. 1, as these relationships exist with a nominal value input signal applied to the input of the control circuit, FIG. 3 is a graph showing the relationships of FIG. 2 as they exist when the input signal applied to the input of the control circuit varies in one sense from the nominal value, and FIG. 4 is a graph showing the relationships of FIG. 2 as they exist when the input signal applied to the input of the control circuit varies in an opposite sense from the nominal value.

DESCRIPTION OF THE PREFERRED EMBODIMENT

Referring to FIG. 1, reference numeral 10 designates a time proportioning control circuit. This control circuit includes a trigger circuit 11 having input terminals 12 and 13, a noninverting output terminal 14, an inverting output terminal 15, and a terminal 16 connected to a source of reference potential 17, for example ground. Positive feedback is provided from output terminal 14 to input terminal 12 by a feedback path including resistor 18. Negative feedback is provided from output terminal 15 to input terminal 12 by an R-C cycler circuit in the form of an integrating circuit which includes resistor 19 and capacitor 20. The output of the integrating circuit (the voltage on capacitor 20) is connected to input terminal 12 by resistor 21.

The output of the apparatus of FIG. 1, is provided at terminals 22 and 23, terminal 23 being connected to the point of reference potential. The input to the apparatus of FIG. 1, is provided at terminals 24 and 25, terminal 25 being connected to the point of reference potential. This input may, for example, be derived from a thermocouple, to apply a positive potential to terminal 24. This positive voltage is processed by trigger circuit 11. The positive feedback circuit, including resistor 18, applies a positive voltage from terminal 14 to terminal 12. Furthermore, a negative voltage is applied from terminal 15 to terminal 12, this voltage being a voltage whose magnitude increases with time, to provide the well-known cycler function. As a result, time proportioning control circuit 10 provides a time proportioning or pulse-width-modulation output.

Referring to FIGS. 2, 3, and 4, reference numerals 30, 31, and 32 identify three different output voltages which exist at terminals 22 and 23 for three different inputs at terminals 24 and 25, all three inputs being such that circuit 10 operates within its proportioning band. For FIG. 2, a nominal magnitude positive voltage is applied at terminal 24, such that time proportioning control circuit 10 provides a cyclic output 30 whose average DC value is zero. In FIG. 3, the magnitude of the positive voltage at terminal 24 has decreased. Here again, the output voltage at terminals 22 and 23 is a cyclic voltage. However, the time proportioning has changed (see output 31, FIG. 3) such that an average positive voltage is present at output terminal 22. Referring to FIG. 4, output 32 shows the output which exists when the positive voltage at terminal 24 has increased from the nominal value. Here again, the output 32 of circuit 10 is a cycling output. However, the average DC value at terminal 22 is now negative.

Should the positive voltage applied to terminal 24 either increase or decrease a substantial amount, circuit 10 no longer operates within its proportioning band and the output voltage of circuit 10 no longer cycles. The output at terminal 22 is then a steady state negative or positive voltage.

Time proportioning control circuit 10, which we have described, is conventional and constitutes no portion of our invention. Our invention relates to an improved means for providing reset feedback with automatic reset lockout while circuit 10 operates within its proportioning band, and as an additional feature, provides anti-reset feedback while circuit 10 operates outside of its proportioning band.

The output of time proportion control circuit 10, existing between terminals 22 and 23, is applied to the input terminals 40 and 41 of a phase inverter 42. Output terminals 43 and 44. The effect of capacitor 45 is to signal of terminal 22, inverted in phase, to a first capacitor means or capacitor 45 and a load means or resistor 46, the elements 45 and 46 being connected in series between terminals 43 and 44. The effect of capacitor 45 is to average the wave form 30, 31, or 32, as shown in FIGS. 2 through 4 respectively. These wave forms are averaged about the potential value of reference potential 17, this being designated as "zero" in FIGS. 2 through 4. In these figures, the wave forms 50, 51, and 52 designate the voltage developed across resistor 46, for each of the wave forms 30, 31, or 32 developed at output terminals 22 and 23. It can be seen that the area of the wave forms 50, 51, and 52, which is above the reference potential level (zero) is equal to the area of the wave forms which is below the reference potential level.

Referring again to FIG. 1, reference numeral 60 designates generally a first clipping means in the form of a diode 61 and a source of DC voltage 62 from terminal 63 to the reference potential. First clipping means 60 responds to a signal which is a given magnitude above the reference potential level, and is effective to clip a voltage present on terminal 63 when this voltage is above the given magnitude. In FIGS. 2, 3, and 4, the clipping potential level achieved by first clipping means 60 is designated by the broken line 64.

Reference numeral 65 designates generally a second clipping means in the form of a diode 66 and a source of DC voltage 67 connected from terminal 63 to the reference potential. Second clipping means 65 responds to a signal which is a given magnitude below the reference potential level to clip a voltage present on terminal 63 when this voltage is below the given magnitude. In FIGS. 2, 3, and 4, the clipping potential level achieved by second clipping means 65 is designated by the broken line 68.

Resistor 70 and a second capacitor 71 form an integrating means which is connected to terminal 63 to integrate the voltage wave forms 50, 51, and 52 (FIGS. 2, 3, and 4) after they are clipped by the first and second clipping means. Referring to FIG. 2, it is seen that the voltage wave form 50 has both its positive and negative half cycles clipped, as designated by the cross-hatched area of these figures. The average value of the cross-hatch area above the reference potential level is equal to the average value of the cross-hatch area below this reference potential level and, as designated by the line 80, FIG. 2, a zero magnitude voltage is developed at capacitor 71. Referring to FIG. 3, wave form 51 is clipped such that the average value which is above and the average value which is below the reference potential level leave a resultant negative steady-state voltage on capacitor 71, as shown by line 81 and the cross-hatch area, FIG. 3.

As shown in FIG. 4, curve 52 is clipped such that an average value positive voltage is maintained on capacitor 71, as designated by line 82 and the cross-hatch area.

The voltage on capacitor 71, that is the voltage represented by lines 80, 81 and 82 of FIGS. 2 through 4, is applied to an impedance coupler 90 having a high input impedance looking toward capacitor 71, and the low output impedance looking toward the input terminal 12 of trigger circuit 11.

It will be remembered that trigger circuit 11 develops a steady-state output voltage at terminal 22, of one polarity or the other, if the input voltage to terminals 24 and 25 increases to the point where time proportioning control circuit 10 no longer operates within its proportioning band. When this occurs, the steady-state voltage at terminal 22 is applied to circuit means 45, 46. However, no voltage is developed across resistor 46 since this steady-state voltage is blocked by capacitor 45. Thus, reset lockout is achieved. That is, when time proportioning control circuit 10 operates outside its proportional band, no voltage is present across capacitor 71 and no reset voltage is applied to input terminal 12 of trigger circuit 11.

Considering the concept of reset feedback, this feedback may be provided in either of two ways—it may be negative feedback of a voltage whose magnitude decreases with time, or it may be positive feedback of a voltage whose magnitude increases with time.

By way of example we show a specific embodiment of the latter wherein the reset voltage applied to terminal 12 is applied in the form of positive feedback—when the input voltage on terminal 24 becomes more positive, the reset voltage applied from the output of impedance coupler 90 to terminal 12 likewise becomes more positive. Also, this positive reset feedback is a voltage which increases with time as capacitor 71 charges from terminal 63 through resistor 70. Our invention may be utilized by a structure providing negative feedback as reset feedback by providing reset whose magnitude reduces with time.

As we have mentioned, when time proportioning control circuit 10 operates outside its proportioning band, capacitor 45 eliminates reset feedback. At this time anti-reset feedback may be desirable. A potentiometer 100 bypasses phase inverter 22 and capacitor 45 to apply the steady-state voltage at terminal 22 to load resistor 46. This steady-state voltage is clipped by one of the first or second clipping means 60 and 65 (depending on the polarity of the voltage at terminal 22) and is applied to integrating circuits 70 and 71. The resulting voltage, which is not inverted by phase inverter 42, is then applied from the output of impedance coupler 90 to terminal 12 as a negative feedback, thus providing anti-reset feedback.

The embodiments of the invention in which an exclusive property or right is claimed are defined as follows:

1. In a time proportioning control circuit, wherein an input signal is converted to a cyclic output signal whose average value is a function of the input signal when the control circuit is operating within its proportioning band, and wherein the input signal is converted to a continuous output signal when the control circuit is operating outside of its proportioning band, a reset feedback means having automatic lockout, comprising:

first capacitor means and a load means connected to receive the output signal and to develop a cyclic control signal across said load means only when the output signal is cyclic, said first capacitor means establishing a reference signal level such that the average of said cyclic control signal above said reference level is equal to the average of said cyclic control signal below said reference level, first clipping means connected to said load means and responsive to a signal of a given magnitude above said reference level to clip that portion of said control signal which is both above said reference level and exceeds said given magnitude, second clipping means connected to said load means and responsive to a signal of a given magnitude below said reference level to clip that portion of said control signal which is both below said reference level and exceeds said given magnitude, and reset feedback means connecting said first and second clipping means to the control circuit.

2. The circuit of claim 1 wherein said first and second clipping means clip respectively at approximately equal magnitudes above and below said reference level.

3. The circuit of claim 1 wherein said first capacitor means and said load means are connected in a series circuit to receive said output signal.

4. The circuit of claim 1 including integrating means connected to said first and second clipping means to integrate the clipped control signal, and wherein said reset feedback means is a positive feedback.

5. The circuit of claim 4 wherein said integrating means includes second capacitor means to be charged by the clipped control signal.

6. The circuit of claim 5 wherein said second capacitor means, and the charge thereon, is connected to the control circuit as positive feedback.

7. The circuit of claim 3 having phase inverting means connected in series with said first capacitor means and said load means, and having bidirectional impedance means connected in parallel with only said first capacitor means and said phase inverting means.

8. The circuit of claim 1 having means connected to receive the output signal and to develop a continuous control signal only when the output signal is continuous, and anti-reset feedback means connecting said last named means to the control circuit.

9. The circuit of claim 3 wherein said first and second clipping means are first and second diodes which are connected respectively to first and second voltage sources of approximately equal magnitudes, wherein the anode of one diode and the cathode of the other diode are connected to the point of connection of said first capacitor means to said load means, and wherein said reset feedback means connects said point of connection to the control circuit.

10. The circuit of claim 9 wherein said reset feedback means includes capacitor integrating means connected to said point of connection and wherein said reset feedback means is a positive feedback.

References Cited

UNITED STATES PATENTS

| | | | |
|---|---|---|---|
| 3,070,750 | 12/1962 | Farber | 307—235 X |
| 3,099,800 | 7/1963 | Vinson et al. | 328—138 X |
| 3,151,299 | 9/1964 | Smith | 328—127 X |
| 3,205,448 | 9/1965 | Bahrs et al. | 307—233 X |
| 3,319,170 | 5/1967 | Harmer | 328—151 X |

JOHN S. HEYMAN, Primary Examiner

S. D. MILLER, Assistant Examiner

U.S. Cl. X.R.

307—229, 237; 329—106, 169; 332—9